Feb. 29, 1944. W. W. SLOANE Re. 22,449

LOADING DEVICE

Original Filed Feb. 26, 1942 12 Sheets-Sheet 1

INVENTOR.
William W. Sloane
BY
Clarence F. Poole
ATTORNEY

Feb. 29, 1944. W. W. SLOANE Re. 22,449

LOADING DEVICE

Original Filed Feb. 26, 1942 12 Sheets-Sheet 2

INVENTOR.
William W. Sloane
BY
Clarence F. Poole
ATTORNEY

Feb. 29, 1944. W. W. SLOANE Re. 22,449

LOADING DEVICE

Original Filed Feb. 26, 1942 12 Sheets-Sheet 3

INVENTOR.
William W. Sloane
BY
Clarence F. Poole
ATTORNEY

Feb. 29, 1944. W. W. SLOANE Re. 22,449
LOADING DEVICE
Original Filed Feb. 26, 1942 12 Sheets-Sheet 4
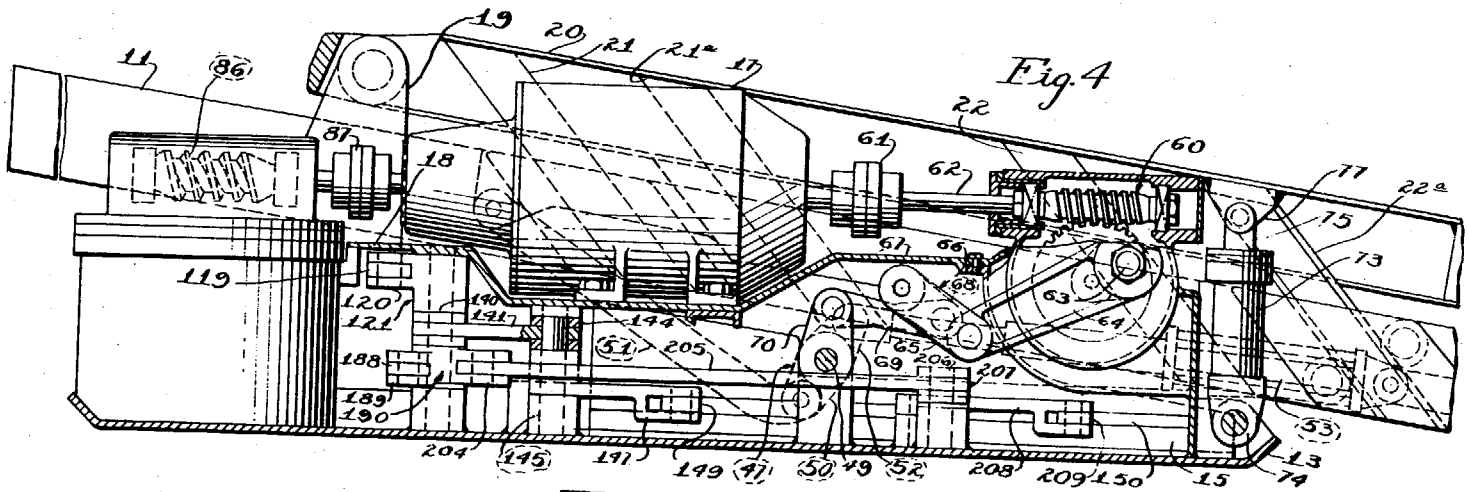
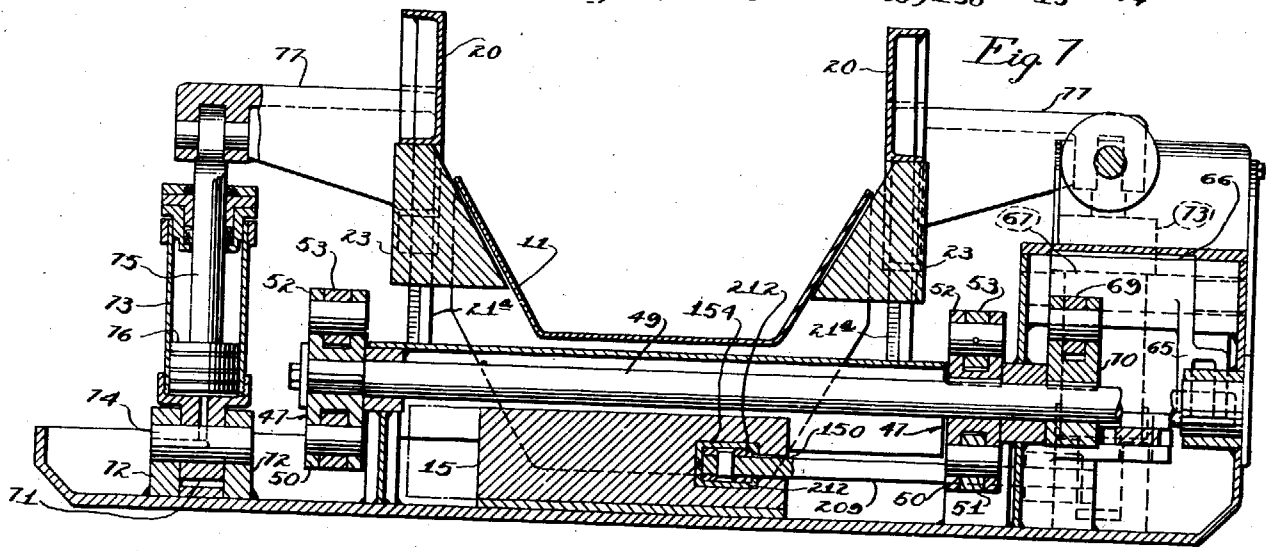
INVENTOR.
William W. Sloane
BY
Clarence F. Poole
ATTORNEY Feb. 29, 1944. W. W. SLOANE Re. 22,449
LOADING DEVICE
Original Filed Feb. 26, 1942 12 Sheets-Sheet 5
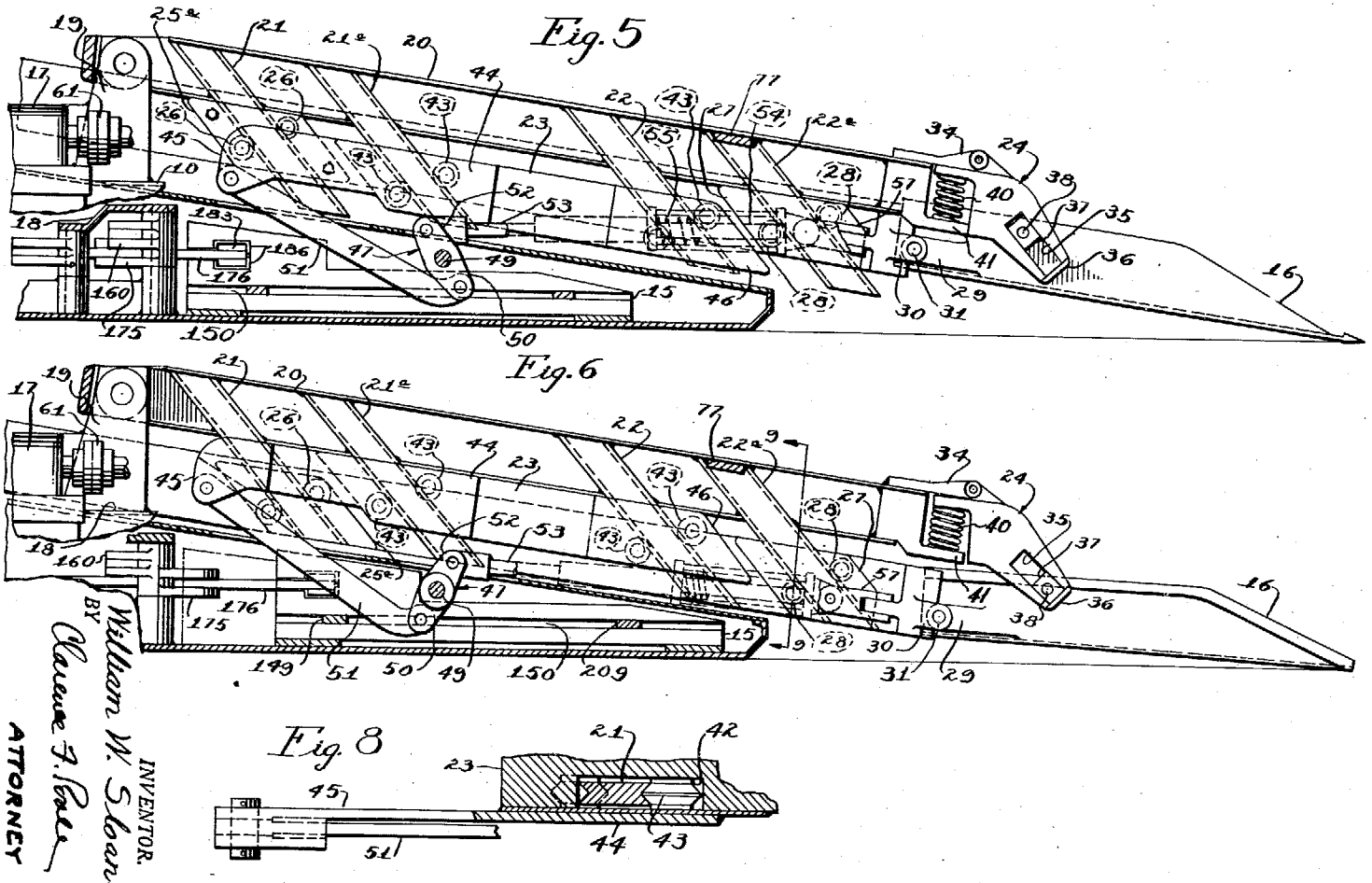
INVENTOR.
William W. Sloane
BY
Clarence F. Poole
ATTORNEY Feb. 29, 1944. W. W. SLOANE Re. 22,449

LOADING DEVICE

Original Filed Feb. 26, 1942 12 Sheets-Sheet 6

INVENTOR.
William W. Sloane
BY
Clarence F. Poole
ATTORNEY

Feb. 29, 1944. W. W. SLOANE Re. 22,449

LOADING DEVICE

Original Filed Feb. 26, 1942 12 Sheets-Sheet 7

INVENTOR.
William W. Sloane
BY
Clarence F. Poole
ATTORNEY

Feb. 29, 1944. W. W. SLOANE Re. 22,449
LOADING DEVICE
Original Filed Feb. 26, 1942 12 Sheets-Sheet 8
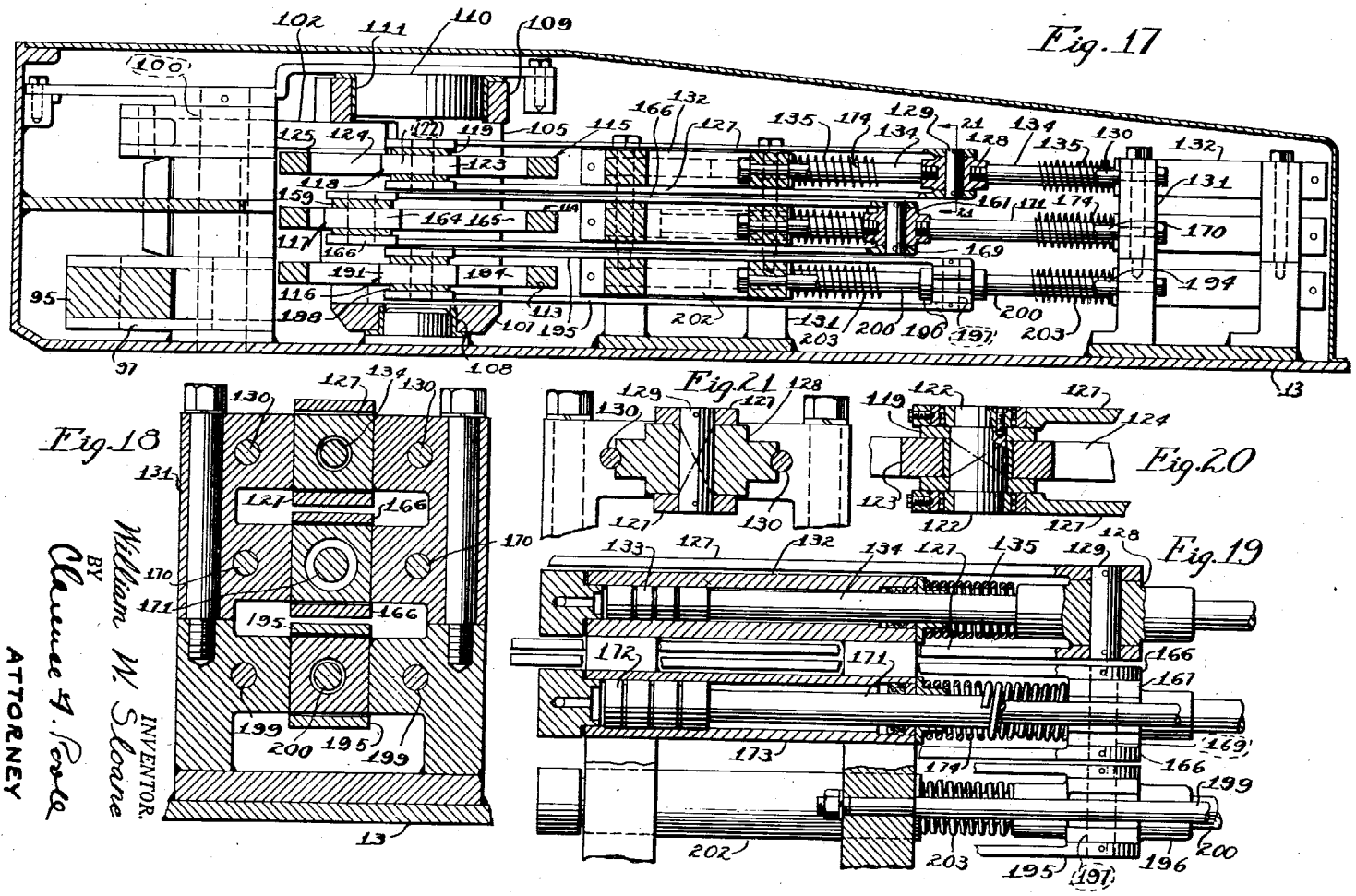
INVENTOR.
William W. Sloane
BY
Clarence A. Poole
ATTORNEY Feb. 29, 1944. W. W. SLOANE Re. 22,449

LOADING DEVICE

Original Filed Feb. 26, 1942 12 Sheets-Sheet 9

INVENTOR.
William W. Sloane
BY
Clarence A. Poole
ATTORNEY

Feb. 29, 1944. W. W. SLOANE Re. 22,449

LOADING DEVICE

Original Filed Feb. 26, 1942 12 Sheets-Sheet 10

INVENTOR.
William W. Sloane
BY
Clarence F. Poole
ATTORNEY

LOADING DEVICE

Original Filed Feb. 26, 1942 12 Sheets-Sheet 11

INVENTOR.
William W. Sloane
BY
Clarence F. Poole
ATTORNEY

LOADING DEVICE

Original Filed Feb. 26, 1942 12 Sheets-Sheet 12

INVENTOR.
William W. Sloane
BY
Clarence F. Pole
ATTORNEY

Reissued Feb. 29, 1944

Re. 22,449

UNITED STATES PATENT OFFICE 22,449

LOADING DEVICE

William W. Sloane, Chicago, Ill., assignor to Goodman Manufacturing Company, Chicago, Ill., a corporation of Illinois Original No. 2,322,481, dated June 22, 1943, Serial No. 432,436, February 26, 1942. Application for reissue December 1, 1943, Serial No. 512,678

30 Claims. (Cl. 198—14)

This invention relates to improvements in loading devices and more particularly relates to a loading device adapted to pick up and load material onto the inby end of a shaker conveyer.

The principal objects of my invention are to provide a new and improved loading device of the class described, particularly adapted for use in mines underground and arranged with a view towards compactness, especially in vertical height and length, and towards ease and efficiency in operation and control.

A further object of my invention is to provide a new and improved loading device consisting of a reciprocating trough section having a shovel on its forward end, for picking up loose material from the ground and loading it onto the inby end of a shaker conveyer trough line and having a novel form of reciprocably driven propelling device driven in timed relation with respect to the reciprocating trough section, for positively feeding the shovel into the material it is desired to load and aiding and accelerating the gathering action of said shovel.

A more specific object of my invention is to provide a novel form of feeding and propelling means for a shaker conveyer loading device which consists in a propelling weight reciprocably driven along the base of the loading device in timed relation with a reciprocating pick-up member of the loading device, together with means for reciprocably driving the propelling weight in various directions in a plane substantially parallel with the ground, and for controlling reciprocation of said propelling weight and the point at which it exerts its greatest propelling force, to cause said propelling weight to move the loading device along the ground in various desired directions.

A still further object of my invention is to provide a reciprocably driven weight for transmitting a propelling force to a stationary object, together with a novel form of drive and control means for the propelling weight arranged to control the direction of reciprocable movement of the weight and vary the points at which its greatest propelling force occurs, to change and reverse the direction of the propelling force transmitted by said weight.

Other objects of my invention will appear from time to time as the following specification proceeds and with reference to the accompanying drawings wherein:

Figure 4 is an enlarged fragmentary longitudinal sectional view taken substantially along line 4—4 of Figure 2;

Figure 5 is an enlarged view in side elevation of the forward end of the loading device, with certain parts broken away and certain other parts shown in longitudinal section in order to show certain details of the support and drive means for the reciprocating trough section and shovel;

Figure 6 is a view somewhat similar to Figure 5, with the reciprocating trough and shovel shown at the opposite end of the stroke than in Figure 5;

Figure 7 is an enlarged fragmentary transverse sectional view taken substantially along line 7—7 of Figure 3;

Figure 8 is an enlarged detail view showing certain details of the support and drive connection for the means for counteracting the reciprocating action of the reciprocating trough section and shovel;

Figure 17 is an enlarged longitudinal sectional view taken substantially along line 17—17 of Figure 3;

Figure 18 is an enlarged fragmentary sectional view taken substantially along line 18—18 of Figure 3;

Figure 19 is an enlarged detail partial fragmentary longitudinal sectional view, showing certain details of the positioning means for the links which reciprocably move the weight along the base of the loading device;

Figure 20 is an enlarged detail view showing certain details of the connection of the stroke control means to the propelling weight;

Figure 21 is an enlarged fragmentary sectional view taken substantially along line 21—21 of Figure 17;

Figure 1:
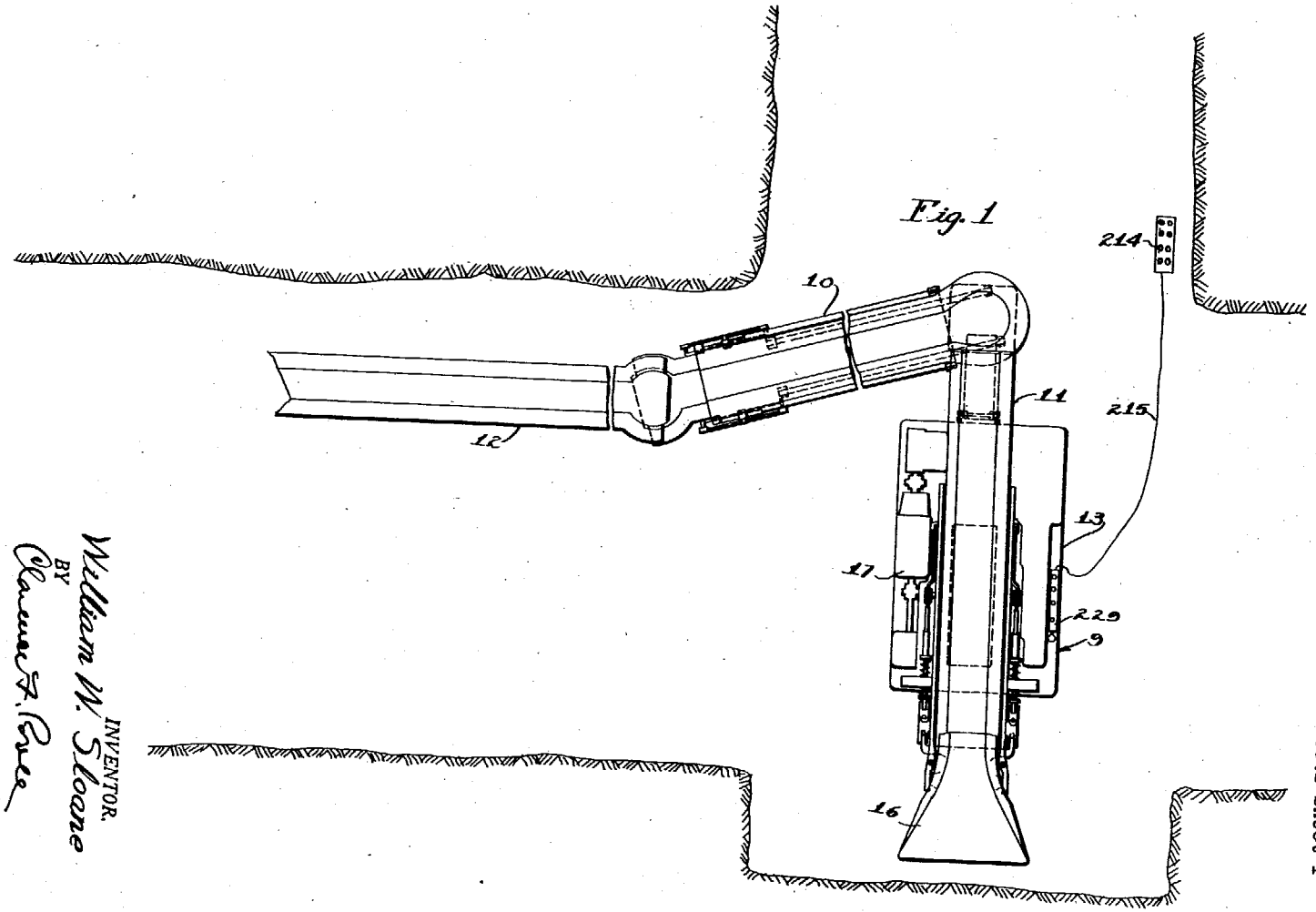
Figure 1 is a diagrammatic plan view of a section of a mine, showing a loading device constructed in accordance with my invention in position to pick up material from a breakthrough which is being cut to connect two adjoining rooms of the mine.
Figure 2:
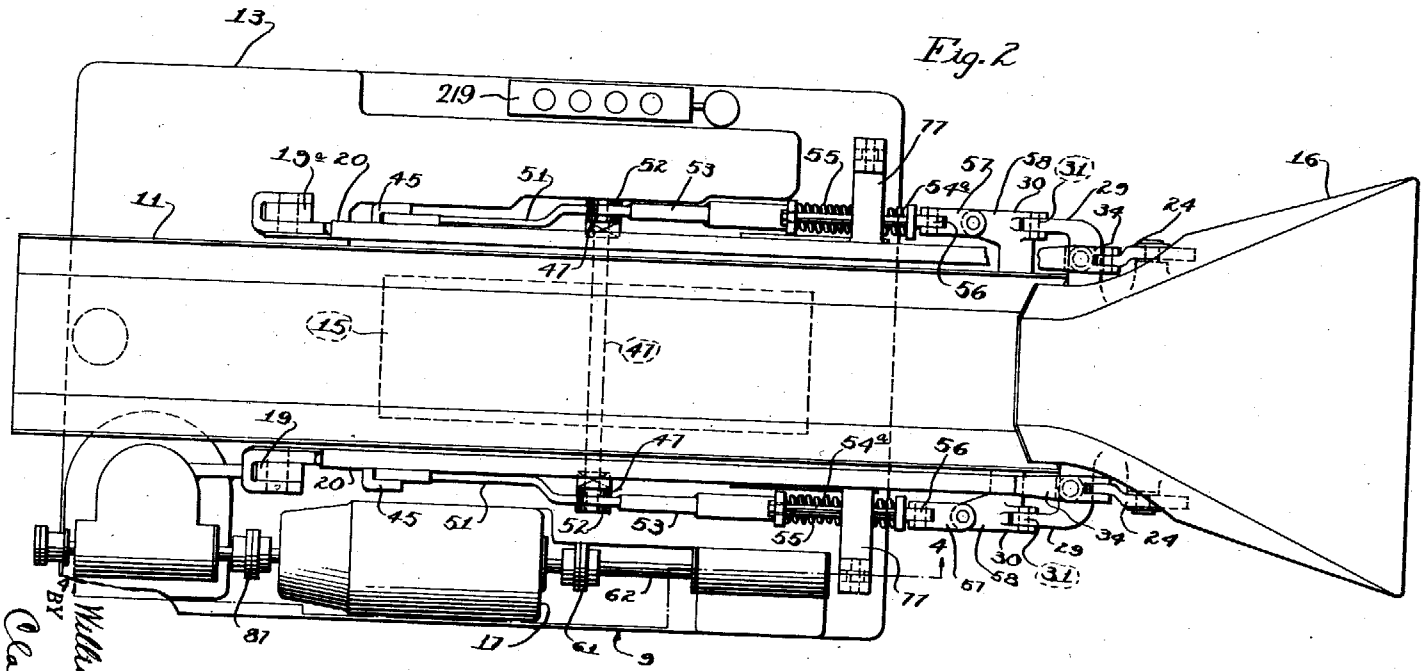
Figure 2 is an enlarged plan view of the loading device shown in Figure 1.

Referring now in particular to the embodiment of my invention illustrated in the drawings, a loading device indicated generally by reference character 9 is shown in Figure 1 as being in position for loading from a breakthrough connecting two parallel working places or rooms of the mine. An extensible and swiveled trough section 10 may be pivotally connected to the rear end of the loading device, for receiving material discharged from the rear end of a reciprocating trough section 11 of the loading device and for transferring it to the inby end of a shaker conveyer trough line generally indicated by reference character 12.

The extensible and swiveled trough section 10 is so arranged as to be automatically extended as the loading device moves towards and from the trough line and is not herein shown or described in detail since it is no part of my present invention and is clearly illustrated and described in a companion application Serial No. 432,786, filed by J. H. Holstein on February 28, 1942.

The shaker conveyer trough line may be of a usual construction, driven from suitable conveyer drive mechanism (not shown). Said drive mechanism is preferably located in the mine entry adjacent the room neck, in cases where the conveyer is extended into a mine room, and is arranged to reciprocably drive the conveyer trough line in such a manner as to move material away from the working face of the room, to the entry.

The loading device 9 includes generally a base frame 13 mounted for slidable movement along the ground on its bottom and having a weighted propelling member 15 extending generally longitudinally thereof and slidably mounted thereon for reciprocable movement with respect thereto in various desired directions and at various intensities, for moving said base frame along the ground and for feeding a shovel 16 on the forward end of the reciprocating trough section 11 into the material it is desired to load.

A motor 17 is provided for driving said reciprocating trough section and for reciprocably moving said propelling weight along said base. Said motor extends along one side of said base and, as herein shown, is mounted on a cover portion 18 of said base which is spaced upwardly from the bottom thereof.

With reference now to the mounting of the reciprocating trough section 11 on the base 13, a pair of laterally spaced upright supports 19, 19a project upwardly from the cover portion 18 of said base and are positioned adjacent the rear end of said base, to form pivotal mountings at their upper ends for the rear ends of side frame members 20, 20. Said side frame members have said reciprocating trough section guided thereon, for reciprocable movement with respect thereto, and extend longitudinally forwardly from said supports beyond the forward end of said base, in parallel relation with respect to each other (see Figures 4, 5, 6 and 14).

The side frame members 20, 20 are adjustably supported adjacent the forward end of said base on the upper ends of piston rods 75, 75 slidable in fluid cylinders 73, 73 and extending upwardly from pistons 76, 76, in said cylinders (see Figures 4 and 7). Each of said fluid cylinders is mounted on a transverse pivotal pin 74, extending through a depending portion 71 of said cylinder and through a pair of parallel spaced lugs 72, 72, projecting upwardly from said base and extending along opposite sides of said depending portion. The upper ends of said piston rods are transversely pivoted to brackets 77, 77 projecting laterally outwardly from said side frame members 20, 20. Fluid under pressure is admitted to the head ends of said cylinders, to elevate said side frame members and the trough section 11 and shovel 16 about the axes of connection of said side frame members to the brackets 19, 19a, by means of suitable fluid control valves and piping connections in a manner which will hereinafter be more clearly described as this specification proceeds.

Each side frame member 20, as herein shown, is provided with a pair of parallel longitudinally spaced inclined guide members 21, 21a, extending angularly forwardly and downwardly therefrom and disposed adjacent the rear end thereof, and with another pair of similar parallel longitudinally spaced guide members 22, 22a disposed adjacent the forward end of said side frame member.

The guide member 21 and the guide member 22a of each side frame member 20 form guide tracks for the reciprocating trough section 11, to guide said trough section to reciprocably move in a forwardly and downwardly inclined direction upon the forward stroke of the conveyer and in a rearwardly and upwardly inclined direction upon the return stroke of the conveyer.

The guide member 21a and the guide member 22 of each side frame member 20 form guide tracks for a reciprocably movable counterweight 23, which is provided to neutralize the tendency of the shaking action of the trough section 11 to move the base 13.

Figure 9:
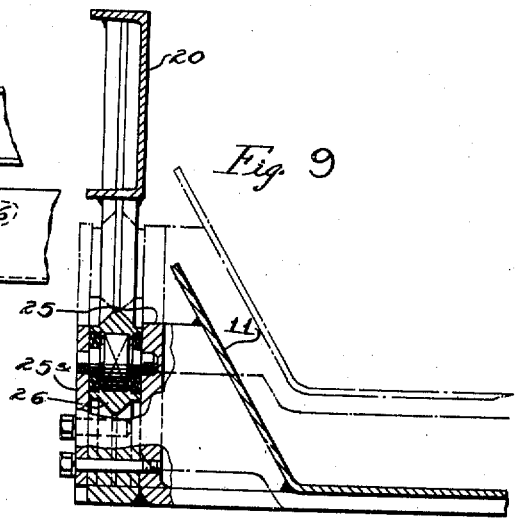
Figure 9 is an enlarged partial fragmentary sectional view taken substantially along line 9—9 of Figure 6.
Figure 11:
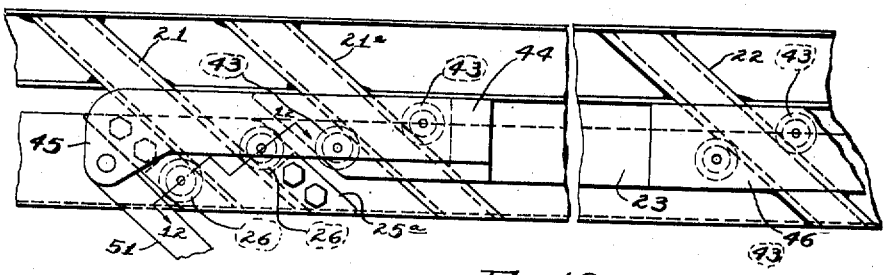
Figure 11 is an enlarged detail view in side elevation showing certain details of the support for the means for counteracting the reciprocating movement of the reciprocating trough section and shovel.
Figure 12:
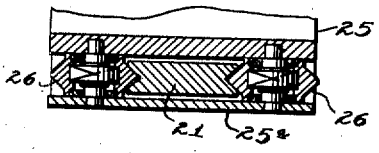
Figure 12 is a detail fragmentary sectional view taken substantially along line 12—12 of Figure 11, and showing certain details of the guiding means for the reciprocating trough section.

The guiding support for the conveyer trough section 11 on each side frame member 20 includes a pair of bracket members 25, 25 disposed adjacent the rear end of said trough section and projecting laterally from opposite sides thereof and extending along the insides of the guide members 21, 21 and outwardly along opposite sides thereof (see Figure 9). A retaining plate 25a is secured to the outside of each bracket member and extends along the outside of said guide member. A pair of longitudinally and vertically spaced rollers 26, 26 are journaled in each bracket and plate, for rotation about transverse axes. Said rollers, as herein shown, have substantially V-shaped faces engaging corresponding V-shaped recesses formed in opposite sides of said rear guide member.

A pair of bracket members and retaining plates indicated generally by reference characters 27, 27 and similar to the bracket members 25, 25 and retaining plates 25a, 25a, project laterally from opposite sides of the forward portion of said trough section. Said bracket members have longitudinally and vertically spaced rollers 28, 28 transversely journaled therein, which are adapted to ride in V-shaped grooves formed in opposite sides of the forward guide members 22a, 22a.

Downward and forward movement of the reciprocating trough section 11 along the guides 21, 21, 22a, 22a is limited by the shovel 16, transversely pivoted to the forward end of said reciprocating trough section and overlapping the receiving end of said trough section at its discharge end. Pivotal movement of said shovel is limited by a pair of spaced yieldable controlling members 24, 24, pivotally connected to and yieldably movable with respect to the forward ends of the side frame members 20, 20.

Figure 13:
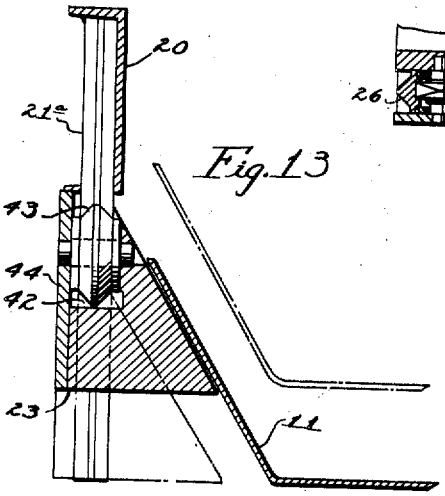
Figure 13 is an enlarged fragmentary detail sectional view taken through the reciprocating trough section and showing certain details of the support for the means for counteracting the reciprocating action of said reciprocating trough section.

Each counterweight 23 is provided with a pair of longitudinally spaced forward and rear recessed portions 42, 42 inclined in the same direction as the guide members 21a and 22. Each of said recessed portions has a pair of longituidnally and vertically spaced rollers 43, 43 mounted therein (see Figures 8 and 13). A retaining plate 44 is secured to the outside of said counterweight and closes the outer open portion of the rear opening 42. Said rear retaining plate forms a support for the outer ends of the shafts on which said rollers are mounted and has a rearwardly projected portion 45 to which the drive mechanism for reciprocably driving said counterweight, is pivotally connected. A retaining plate 46 closes said forward recessed portion and forms a support for the outer ends for the shafts on which the forward rollers 43, 43 are mounted. The guide members 21a and 22 fit within said recessed portions and are engaged by the V-shaped rollers 43, 43 and form a supporting guide for said counterweight on said side frame members.

The pivotal supporting connection between the reciprocating trough section 11 and the shovel 16 includes a pair of laterally spaced ears 29, 29, projecting rearwardly from opposite sides of said shovel and pivotally connected with bracket members 30, 30 by means of pivotal pins 31, 31. Said bracket members project laterally and forwardly from opposite sides of the forward end of said reciprocating trough section and also form a connection for the means for reciprocably driving said reciprocating trough section from the motor 17.

The controlling members 24, 24 for the shovel 16 depend from and are transversely pivoted at their upper ends to brackets 34, 34, projecting forwardly from the forward ends of the side frame members 20, 20. Said control members each have a downwardly inclined slotted portion 35, opening towards the ground and closed by a retaining member 36. A block 37 is slidably mounted in each slot 35 and is pivotally connected to an outer side of the shovel 16 by a pivotal pin 38. An arm 39 projects rearwardly from the upper portion of each of said control members just beneath the bracket 34 and forms a seat for the upper end of a compression spring 40, supported at its lower end in a forwardly projecting portion 41 of said side frame member. Said springs are adapted to yield upon the forward strokes of the conveyer as said blocks 37, 37 slidably move along the slots 35, 35 to permit said shovel to yieldably pivot about the axes of the pins 31, 31 and to yieldably engage the forward end of said shovel with the ground. Pivotal movement of said shovel in an opposite direction is limited by engagement of the arms 39, 39 with the under sides of the brackets 34, 34.

The mechanism for reciprocably driving the trough section 11 and shovel 16 along the guide members 21, 21, 22a, 22a and for reciprocably moving the counterweights 23, 23 along the guide members 21a, 21a, 22, 22 in opposite phase relationship with respect to said reciprocating trough section and shovel includes a pair of rocking members 47, 47, mounted adjacent opposite ends of a transverse rock shaft 49 (see Figures 5, 6 and 7). An arm 50 depends from each rocking member 47. Each of said arms has a drive link 51 pivotally connected thereto and extending angularly upwardly and rearwardly therefrom. Said arms are connected at their rear ends to the projecting portions 45, 45 of the retaining plates 44, 44, secured to the outer portions of said counterweights.

An arm 52 projects upwardly from each rocking member 47 in a diametrically opposite direction from the arm 50, and has pivotal connection with the rear end of a link 53, pivotally connected to the forward end of the reciprocating trough section 11. A plunger 54 is slidably mounted in the forward end of said link and is encircled by a preloaded compression spring 55 (see Figure 3). Said spring is loaded by means of a pair of vertically spaced parallel rods 54a, 54a, which are threaded in a collar 48, adjacent the forward end of said plunger, and which are slidably mounted in a flanged portion of said link, which abuts the rear end of said spring. An eye 56 is formed on the forward end of said plunger and is transversely pivoted to a forked portion of a connecting link 57. Said connecting link in turn has vertical pivotal connection with an ear 59 projecting rearwardly from the bracket member 30, thus forming a universal connection between the end of said link and said trough section. The compression springs 55, 55 are loaded to such an extent and their strength is such that said plungers normally act as solid members and there is no movement of said plunger with respect to said links, said springs being adapted to yield only when the forward end of the shovel 16 engages a solid obstruction, to prevent damage to said shovel and the drive mechanism therefor.

The transverse rock shaft 49 is oscillatively driven from the motor 17 by means of a worm and worm gear drive indicated generally by reference character 60 and driven from the forward end of said motor by means of a suitable coupling 61 and a shaft 62, extending longitudinally forwardly from said coupling (see Figure 4). A crank 63 is driven from the worm gear of said worm and worm gear drive and has a link 64 journaled thereon. The end of said link opposite from said crank has pivotal connection with an arm 65 of a rocking member 66, which is journaled on a transversely extending shaft 67. Said rocking member has a depending rocking arm 68, which has a link 69 pivotally connected thereto. The end of said link opposite from said rocking arm has pivotal connection with a rocking arm 70 secured to the transverse rock shaft 49, for rocking said rock shaft.

The arrangement of said crank, links, and rocking arms is such as to rock the rocking shaft 49 and reciprocably drive the trough section 11 in such a manner as to cause material to move from the forward to rear end of said trough section by reciprocable movement of said trough section, and to reciprocably move the counterweights 23, 23 along the guide tracks 21a, 22 in opposite phase relationship with respect to said trough section, to counteract the effect of the reciprocable action of said trough section to move the base 13 along the ground.

Referring now in particular to the weighted propelling member 15 and the means whereby it may be employed for propelling the base bodily along the ground, it will be understood that said weighted propelling member is actuated by a drive mechanism as hereinafter described, so as to be given an unbalanced reciprocating motion essentially like that commonly employed in shaker conveyers. This shaker motion may perhaps be best described in simple terms as one in which the reciprocating weight is given a relatively quick reversal at the end of its forward stroke, and a relatively slow reversal at the end of its rearward stroke, so as to exert a resultant propelling force in a forward direction.

It will further be understood that the direction of the resultant impelling force can be reversed by providing means for interchanging the quick and slow reversals at the opposite ends of the strokes, i. e., by effecting the quick reversal at the end of the return stroke, and the slow reversal at the end of the forward stroke.

This unbalanced shaker motion may also be described in greater detail in terms of relative velocity or acceleration, thus: the propelling weight is gradually accelerated from the beginning of its forward stroke to a point of maximum velocity near the end of said stroke; is then quickly decelerated until it reaches the end of its forward stroke, is then quickly accelerated from the beginning of the return stroke until a point of maximum velocity is reached near the beginning of said return stroke, and is then slowly decelerated through the rest of the return stroke. The resultant impelling force is exerted in the forward direction; it is reversed by reversing the cycle or phase of accelerations and decelerations respectively, during the forward and reverse strokes.

As will hereinafter more fully appear, applicant provides means for reversing the direction of the resultant impelling force of the weight and for directing the impelling force of said weight in various directions so that the entire base including all the mechanism carried thereby can be propelled along the ground selectively in any desired direction.

Figure 15:
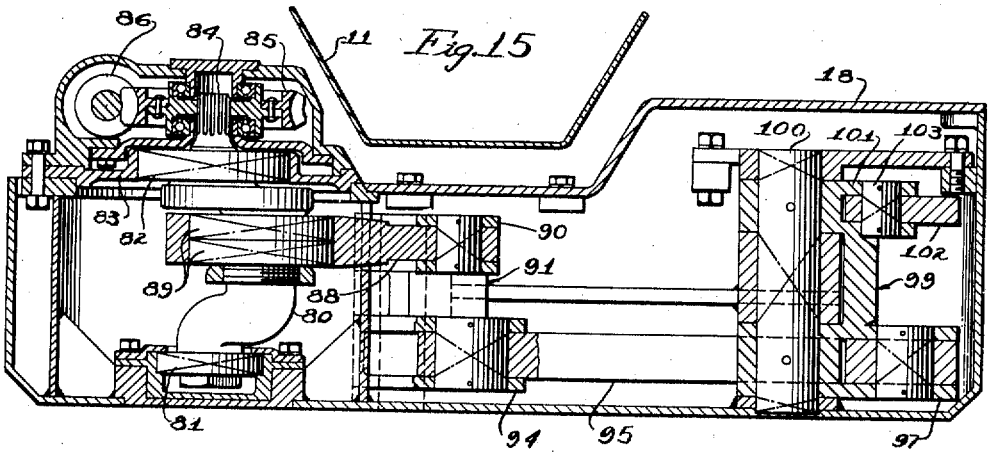
Figure 15 is a transverse sectional view taken substantially along line 15—15 of Figure 3.

Referring now in particular to the means for reciprocably moving the weighted propelling member 15 in various desired directions along the base 13 and for controlling the stroke of movement thereof, a crank 80 is rotatably journaled at its lower end on the bottom of the base frame 13 on a bearing 81, and adjacent its upper end on a bearing 82 mounted in a bearing support member 83 secured to the cover portion 18 of said base frame (see Figure 15). Said crank has a splined portion 84 which projects upwardly from the bearing 82 and engages a splined hub of a worm gear 85. Said worm gear is driven from a longitudinally extending worm 86, which in turn is driven from the rear end of the motor 17 by means of a suitable coupling 87 (see Figure 4).

Figure 16:
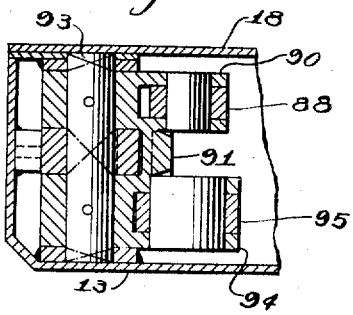
Figure 16 is an enlarged fragmentary detail sectional view taken substantially along line 16—16 of Figure 3.
Figure 22:
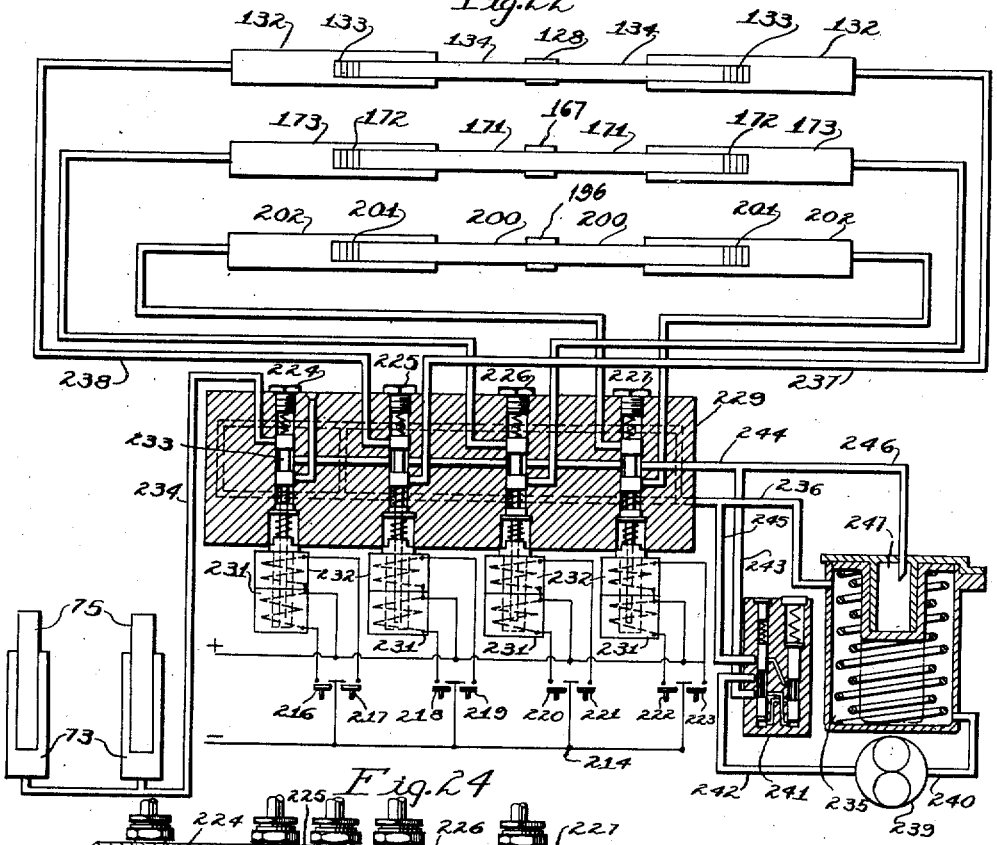
Figure 22 is a diagrammatic view showing certain details of the remote electrical control and the fluid control, for controlling the operative positions of the drive links for the propelling weight.
Figure 24:
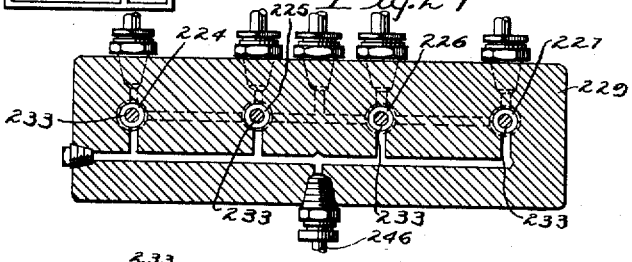
Figure 24 is a sectional view taken substantially along line 24—24 of Figure 23.
Figure 23:
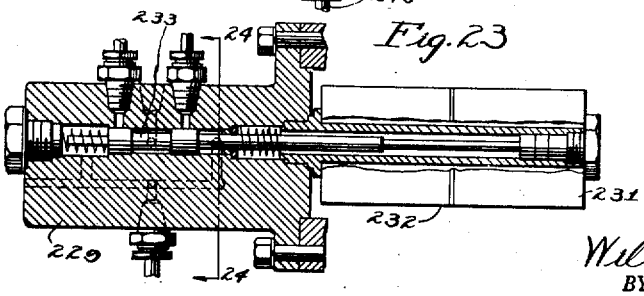
Figure 23 is a partial fragmentary transverse sectional view taken through the valve manifold illustrated in Figure 22.

A connecting link 88 is journaled on the crank 80 on ball bearings 89, 89. The free end of said connecting link has pivotal connection with a horizontally extending rocking arm 90 of a rocking member 91. Said rocking member is secured to a vertical shaft 93, which is suitably journaled at its ends and intermediate its ends in the base frame 13 (see Figure 16). A lower horizontally extending arm 94 of said rocking member has a link 95 pivotally connected thereto, which has pivotal connection at its end opposite from said arm with an arm 97 projecting horizontally from the lower end of a rocking member 99 (see Figures 3 and 15). Said rocking member is mounted on a vertical shaft 100 suitably journaled in the base frame 13. An arm 101 projects horizontally from the upper end of said rocking member and has a link 102 pivotally connected thereto by means of a pivotal pin 103. The end of said link opposite from said arm is pivotally connected with and drives an oscillatively movable drive member 105.

Figure 3:
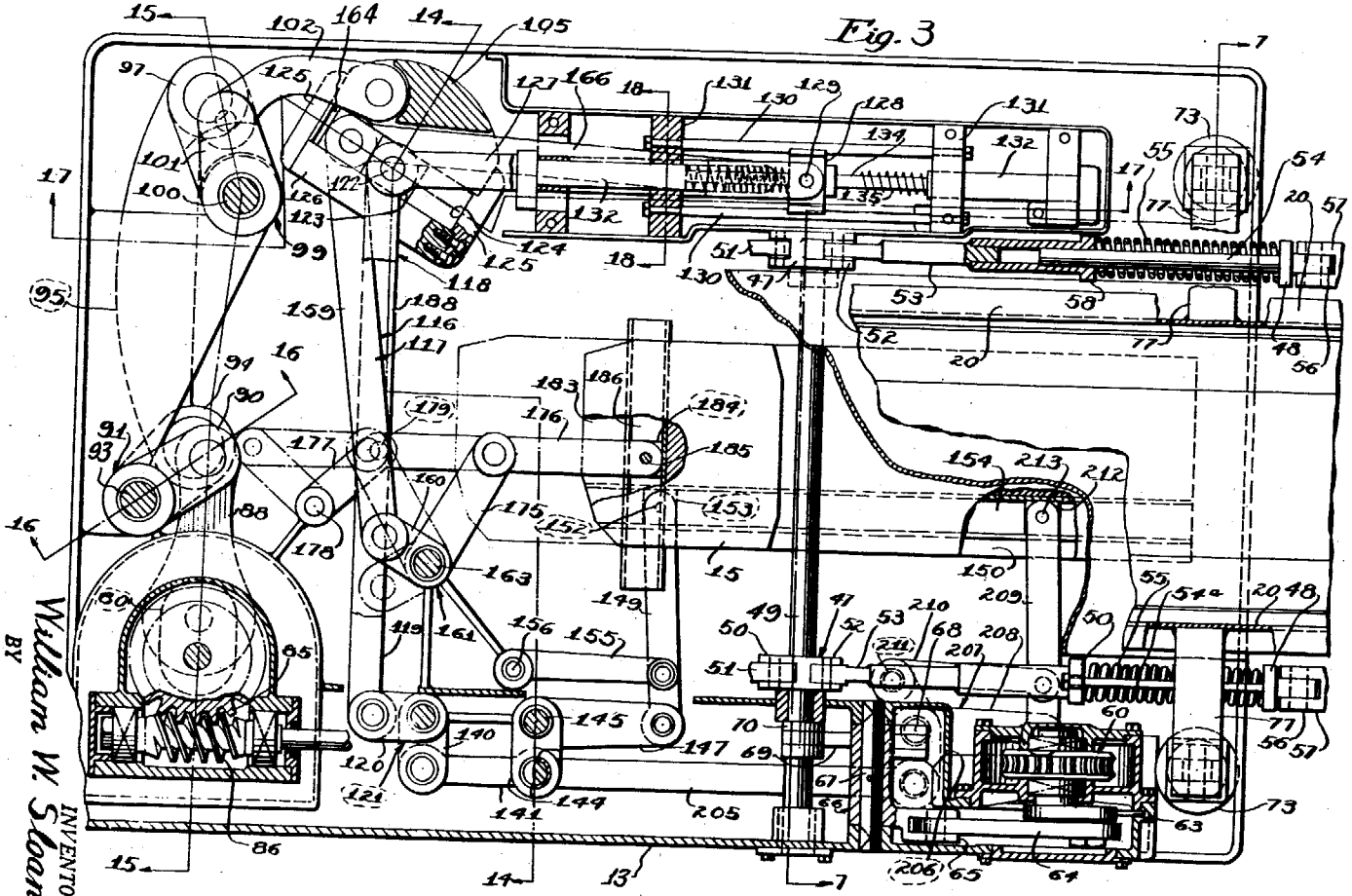
Figure 3 is an enlarged fragmentary plan view of the loading device shown in Figure 1, with parts of the reciprocating trough section broken away and other parts removed and shown in horizontal section, in order to more clearly illustrate certain details of my invention.
Figure 10:
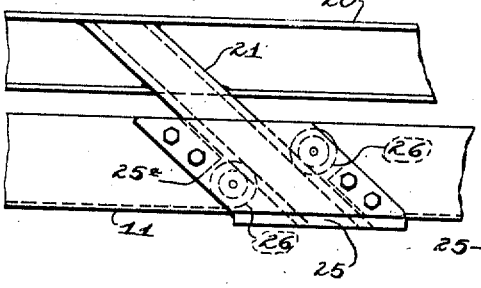
Figure 10 is a detail view in side elevation, showing certain details of the supporting means for the reciprocating trough section.
Figure 14:
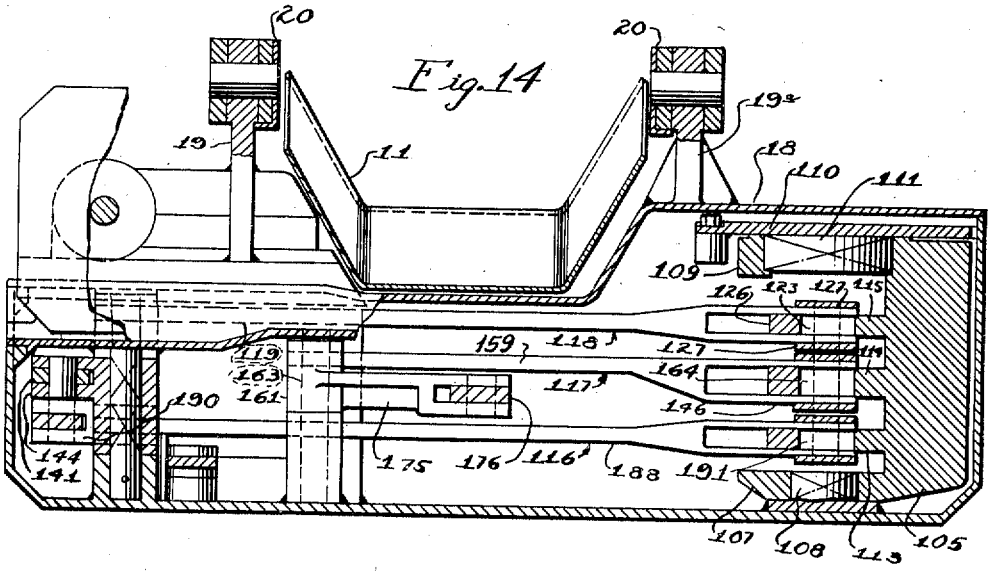
Figure 14 is a transverse sectional view taken substantially along line 14—14 of Figure 3.

The oscillating drive member 105 is best shown in Figures 3, 14, and 17 and extends vertically from the bottom of the base frame 13 to a position just beneath the cover 18. Said drive member is provided with a lower inwardly projecting portion 107 journaled on the bottom of the base 13 on a bearing 108. Said drive member is likewise provided with an upper inwardly projecting portion 109, spaced vertically from said lower portion and journaled on a bearing support member 110 on a bearing 111.

The means for reciprocably driving the propelling weight 15 along the base 13 in various directions with respect thereto in a plane parallel with said base, includes three vertically spaced slotted drive portions 113, 114 and 115 projecting inwardly from said drive member and disposed intermediate the portions 107 and 109 and forming a drive means for driving three vertically spaced linkage connections 116, 117 and 118 respectively. Said linkage connections are connected with the propelling member 15 at different points, and are selectively operable to drive said propelling member in different desired directions and in different phase relationships with respect to the base 13, for causing said base to move along the ground in the desired direction.

The upper linkage connection 118 has drive connection with one side of the weight 15, adjacent the rear end thereof, for reciprocably moving said weight in a sidewise direction, and includes a link 119 connected at one of its ends to a rocking arm 120 of a rocking member 121. The opposite end of said link extends along opposite sides of the drive portion 115 of the drive member 105 and along the upper and lower sides of a guide block 123 and is connected therewith by means of a vertical pin 122, journaled in said block (see Figure 20). Said block is slidably movable in a guide slot 124, which forms the slotted portion of said upper drive portion 115.

The guide slot 124, as herein shown, is formed from a pair of parallel spaced members 125, 125, secured to and extending inwardly from opposite sides of the drive portion 115 and connected together at their free ends by means of a retaining member 126. Said slot 124 is intersected by the axis of rocking movement of said drive member 105, and is so arranged that the block 123 may be so positioned in said driving slot that the vertical axis of the pin 122 will be coaxial with the axis of rocking movement of said drive member. When said block is in this position there will be no reciprocable movement of said linkage connection, and said linkage connection will have no driving effect on said propelling weight. When said block is on one side of the pivotal axis of said drive member, said weight will be driven to impart a moving force in one direction, and when said block is on the opposite side of the pivotal axis of said drive member, said weight will be driven to impart a moving force in an opposite direction. Also, the farther said block is positioned from the pivotal axis of said drive member, the more violent will be the reciprocating action of said propelling weight and the greater will be the propelling force thereof.

The position of the block 123 in the slot 124 is controlled by means of a pair of stroke control links 127, 127, pivotally connected to opposite ends of the pin 122 and extending forwardly therefrom. Said stroke control links are connected at their forward ends to a slidably movable guide member 128, by a vertical pin 129. Said guide member is slidably guided at its outer ends in a pair of parallel spaced longitudinally extending guide rods 130, 130, which are mounted at their ends in a pair of longitudinally spaced support members 131, 131, secured to and projecting vertically from the base 13 (see Figures 3, 17, 18 and 21).

The means for moving said guide member and stroke control links or for holding said guide member and stroke control links in a fixed position, includes a pair of aligned opposed cylinders 132, 132, extending longitudinally of the base 13. Each of said cylinders has a piston 133 movable therein, from which extends a piston rod 134. The adjacent ends of said piston rods are herein shown as being threaded in and projecting in opposite directions from the guide member 128.

A compression spring 135 encircles each piston rod 134 and is adapted to be engaged by the guide member 128 when the piston 133, connected to the opposite piston rod 134, has traveled substantially half its stroke, to counteract the tendency of said piston to travel its entire stroke without stopping and to aid in initially returning said piston to the opposite end of its cylinder.

Fluid under pressure may be admitted to either of said cylinders or held therein under pressure by a suitable system of piping and valves, the details of which will be more fully described as this specification proceeds.

Movement of the guide member 128 along the guide rods 130, 130 will thus slidably move the block 123 along the driving slot 124, to position the upper linkage connection 118 to reciprocably drive the propelling member 15 in one direction at varying intensities, depending upon the distance of said block from the pivotal axis of the drive member 15, and to interchange the propelling effect and the point of quick reversal of said weighted member from one end of the stroke to the other, to cause said weighted member to reverse the direction of movement of the base 13 along the ground. It is understood that reversal of the direction of movement of said base is effected by shifting the block 123 to one side or the other of the axis of rocking movement of said drive member.

The linkage connection from the link 119 and rocking member 121 to the propelling member 15 includes an outwardly projecting arm 140 of the rocking member 121, having a link 141 pivotally connected thereto. Said link extends longitudinally forwardly from said rocking arm and has pivotal connection with a rocking member 144 on a vertical shaft 145. A rocking arm 147 extends in a forward direction from said shaft and has a drive link 149 pivotally connected to its free end and extending inwardly therefrom and having pivotal connection at its inner end with said propelling weight.

The end of the drive link 149 opposite from the rocking arm 147 extends within a longitudinally slotted portion 150 of the propelling weight 15. Said end of said drive link is slidably guided in said slotted portion so said link will reciprocably move said propelling weight transversely of said base, but will permit longitudinal movement of said weight with respect to said link. The guiding connection between said link and said slotted portion includes a pair of bearing blocks 153, 153 abutting the top and bottom sides of said link and pivotally connected thereto by a pivotal pin 152. Said bearing blocks are slidably mounted in facing longitudinally extending channelled bearing members 154, 154, mounted in and extending along said slotted portion, to permit longitudinal movement of said propelling weight with respect to said link.

A control arm 155 is provided to prevent movement of said drive link in a direction longitudinally of said base during reciprocable movement of said weight in longitudinal or transverse directions. Said control arm is pivotally mounted on the base frame 13 on a pivotal pin 156 and has pivotal connection at its free end with the drive link 149, at a point spaced a slight distance inwardly from the rocking arm 147.

The intermediate linkage connection 117 is adapted to reciprocably move the propelling weight 15 longitudinally of the base frame 13 and includes a transversely extending link 159 pivotally connected at its inner end to an arm 160 of a rocking member 161. Said rocking member is rockingly mounted on the base frame 13 on a vertical shaft 163 and has connection with the propelling weight 105, for reciprocably moving said propelling weight longitudinally of said base. The end of said link opposite from said rocking arm is of a bifurcated formation and is connected to opposite sides of a guide block 164, guided in a guide slot 165 formed in the drive portion 114 in a manner similar to which the driving slot 124 is formed in the drive portion 115.

A pair of stroke control links 166, 166 are pivotally connected to the outer sides of the bifurcated portion of said link 159 and extend longitudinally forwardly therefrom and are pivotally connected at their forward ends to opposite sides of a guide member 167 by means of a vertical pin 169. Said guide member is constructed in a manner similar to the guide member 128 and is supported and guided in a pair of parallel spaced guide rods 170, 170, mounted at their ends in the support members 131, 131.

Two aligned piston rods 171, 171 are threaded in and project in opposite directions from said guide member and, as herein shown, have pistons 172, 172 at their outer ends, which are slidably mounted in fluid cylinders 173, 173, for moving said guide member longitudinally along the guide rods 170, 170 and moving the block 164 and link 159 to various desired positions with respect to the drive member 105. Compression springs 174, 174 encircle said piston rods and are adapted to counteract the tendency of said pistons to travel their full stroke and to initially aid said pistons in moving the guide member 167 and stroke control links 166, 166. It should here be noted that the cylinders 173, 173 and pistons 172, 172 are of a larger diameter than the cylinders 132, 132 and pistons 133, 133. The reason for this is that two linkage connections are provided to move the propelling weight 15 transversely of the base while only one linkage connection is provided to move said weight longitudinally of the base. The reaction against the stroke control links 166, 166 is thus twice as great as the reaction against the control links which control the strokes of the linkage connections 116 and 118.

The connections from the rocking member 161 to the propelling weight 15 includes an inwardly and forwardly projecting rocking arm 175 having pivotal connection with a generally longitudinally extending drive link 176. A control arm 177, rockingly mounted on the base frame 13 on a vertical shaft 178, is pivotally connected at its free end to the rear end of the drive link 176 by a pivotal pin 179, to prevent transverse movement of said link during reciprocable movement of said propelling weight.

The forward end of the drive link 176 extends within a transversely slotted portion 183 of the rear end wall of the propelling weight 15, and has bearing blocks 184, 184 pivotally connected to opposite sides thereof by means of a pivotal pin 185. Said bearing blocks are guided in facing channelled bearing members 186, 186 mounted in the slot 183 and extending transversely thereof, beyond opposite sides of said propelling weight so said propelling weight may move transversely of the base 13 while said drive link is held from transverse movement by the control link 177.

Thus when the block 164 is to one side or the other of the axis of rocking movement of the drive member 105, the intermediate linkage connection 117 will reciprocably move the propelling weight 15 longitudinally of the base 13, to cause said base to move in a forward or rearward direction with respect to the working face at varying rates of speed, depending upon the position of said guide block with respect to the pivotal axis of said drive member.

It should here be understood that said trough section and shovel are driven to convey material in a direction which is reverse to the direction of forward movement of the base 13. Movement of said linkage connection is so synchronized with reciprocable movement of the shovel 16 that when said propelling weight is advancing said shovel into the material it is desired to load, the point of quick reversal of said propelling weight will be reached upon its forward strokes at the same time said shovel makes its slow reversal at the ends of its return strokes, so the shovel will be moving in a forward direction into the material it is desired to load at the same time the propelling weight is advancing the base 13 into the material it is desired to load.

The lower linkage connection 116 is provided to reciprocably drive the forward end of the propelling weight 15 transversely of the base frame 13. Said linkage connection includes a link 188 pivotally connected at one of its ends to a rocking arm 189 of a rocking member 190, herein shown as being disposed beneath the rocking member 121 and mounted coaxially with said rocking member (see Figures 4 and 14). The end of said link opposite from said rocking arm is bifurcated and extends along opposite sides of a guide block 191 and is pivotally connected thereto. Said guide block is slidably movable in a slot 194 formed in the driving portion 113 of the drive member 105 in the same manner the slot 124 is formed in the driving portion 115 of said drive member.

A pair of stroke control links 195, 195 are pivotally connected to opposite sides of the bifurcated portion of the link 188 in the same manner the stroke control links 127, 127 are pivotally connected to opposite sides of the link 119. Said stroke control links 195 extend longitudinally forwardly of the link 188 and are pivotally connected at their forward ends to opposite sides of a guide member 196 by means of a pivotal pin 197. Said guide member is slidably guided in guide rods 199, 199 mounted at their ends in the support members 131, 131. A pair of oppositely extending piston rods 200, 200 are herein shown as being threaded in opposite ends of said guide member. Each of said piston rods has a piston 201 on the free end thereof which is movable in a fluid cylinder 202. Compression springs 203, 203 encircle said piston rods and serve the same purpose as the compression springs 135, 135 and 174, 174.

The rocking member 190 has a rocking arm 204 disposed beneath and extending in the same general direction as the arm 140 of the rocking member 121 (see Figure 4). A link 205 is pivotally connected to the free end of said rocking arm and extends longitudinally forwardly therefrom. The forward end of said link has pivotal connection with an arm 206 of a rocking member 207. An arm 208 of said rocking member extends longitudinally forward therefrom and has the outer end of a drive link 209 pivotally connected thereto. A control link 210 is pivotally mounted on the base frame 13 on a vertical pin 211 and has pivotal connection with the drive link 209 a slight distance inwardly of the point of connection of said drive link to the rocking member 207, for preventing longitudinal movement of said drive link with respect to said propelling weight. The inner end of said drive link extends within the slotted portion 150 of the propelling weight 15 and has a pair of vertically spaced bearing blocks 212, 212, abutting opposite sides thereof and pivotally connected thereto by means of a pivotal pin 213. Said bearing blocks extend along the top and bottom sides of the inner end of said control link and are slidably guided in the channelled bearing members 154, 154.

Referring now in particular to Figures 1 and 22 to 24 and the means for controlling the flow of fluid to the cylinders 132, 132, 173, 173 and 202, 202 and controlling movement of the propelling weight 15, when being reciprocably moved in various angular directions, a remote push button control generally indicated by reference character 214 is provided. Said push button control is adapted to be placed remote from the machine and connected thereto by means of an electric cable 215 (see Figure 1). Said control is diagrammatically illustrated in Figure 22 and may consist of a plurality of push buttons 216, 217, 218, 219, 220, 221, 222, and 223, each of which push buttons is adapted to control certain operations of the device. A plurality of solenoid operated valves 224, 225, 226 and 227, herein shown as being in a valve manifold 229, are mounted on one side of the machine and the solenoids of said valves are operatively connected with said push buttons.

The valves 224 to 227 inclusive are of a well known balanced type of piston valve, so will not herein be described in detail, and are of a similar construction so the same part numbers will be applied to the same operating parts of each of said valves. Each of said valves is operated by two aligned solenoids 231, 232, so arranged that the solenoid 231 will move a piston 233 of one valve in one direction and the other solenoid 232 will move said piston in an opposite direction.

The valve 224 is operative by the push buttons 216 and 217 and has connection with the head ends of the cylinders 73, 73, for admitting fluid under pressure thereto and holding pressure therein or permitting fluid to be released therefrom. The piston 233 of said valve is normally in a position to close the pressure ports thereof, when the push button switches 216 and 217 are open. When pressure is applied to the push button 216, to close the circuit to the solenoid 231 of said valve 224, the piston 233 of said valve will move in a direction towards said solenoid to open a pressure port leading to a pipe 234, connected with the head ends of the cylinders 73, 73 to permit fluid under pressure to flow from said cylinders to a storage reservoir 235 through a pipe 236 and to permit lowering of the trough section 11 and shovel 16. When the push button switch 217 is closed and the push button switch 216 is open, the piston 233 will be moved in an opposite direction to admit fluid under pressure to the pipe 234 and the cylinders 73, 73 and elevate said reciprocating trough section and shovel. When both push buttons are open, the piston 233 will return to a position to close the port leading to the pipe 234 and hold pressure in the cylinders 73, 73.

When the push button 218, controlling operation of the valve 225, is closed, fluid under pressure will be admitted to the right-hand cylinder 132 through a pipe 237, and will be exhausted from the left-hand cylinder through a pipe 238, leading to said valve. When the push button 219 is closed, fluid under pressure will be admitted to the left-hand cylinder 132 through the pipe 238, the port leading to the pipe 237 being open at this time, to permit the return of fluid from the right-hand cylinder 132 to the fluid storage tank 235. The instant, however, both push buttons 218 and 219 are open, the ports leading from the pipes 237 and 238 will be closed, to hold pressure in said pipes and to hold the pistons 133, 133 in the desired position in their cylinders, thus holding the block 123 in the desired position in the slot 124, to provide the desired driving effect of linkage arrangement 118.

Similarly, closing of the push button 220 will cause the pistons 172, 172 to move from right to left and closing of the push button 221 will cause said pistons to move in the opposite direction. The pistons 201, 201 are controlled by the valve 227 and push buttons 222 and 223 in the same manner that the pistons 172, 172 and 133, 133 are controlled by their respective valves 225 and 226.

Pressure is effected in the system by means of a pump 239 connected with the storage tank 235 by means of a pipe 240. Said pump may be of any type but is herein diagrammatically shown as being of a well known type of gear pump. The pressure side of said pump is connected with a relief valve generally indicated by reference character 241 by means of a pipe 242. A high pressure pipe 243 leads from said relief valve to a high pressure line 244, connected with the valve manifold 229, for supplying fluid under pressure thereto. A pipe 245 connects said valve with the return pipe 236 leading to the fluid storage tank 235, to relieve pressure from the system upon overload thereof in an obvious manner. The pressure pipe 244 has a branch 246 leading to an accumulator 247, for building up pressure and supplying fluid under pressure to the manifold 229 when the pmp 239 is not in operation. Said accumulator, as herein shown, is built into and is a part of the storage reservoir 235, and is of a type well known to those skilled in the art so is not herein shown or described in detail.

Figure 25:
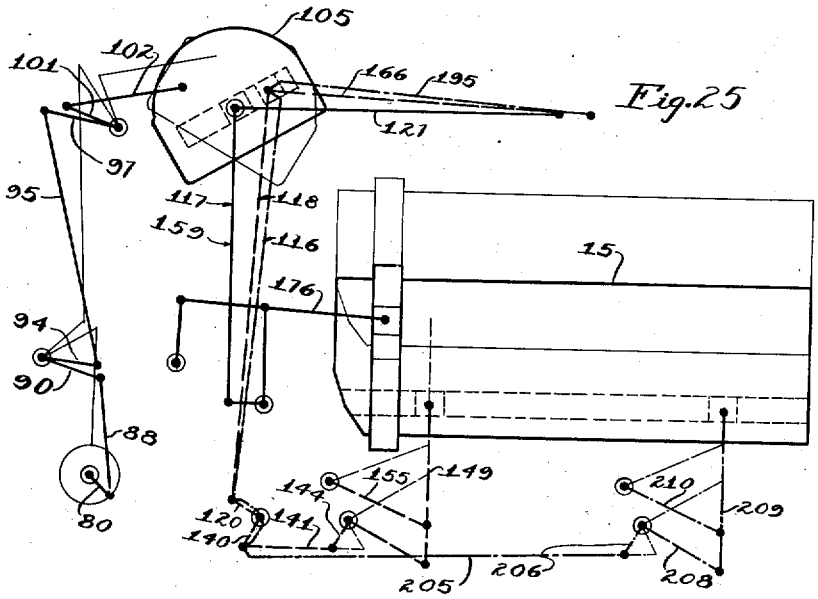
Figures 25, 26, 27, 28, 29 and 30 are diagrammatic views illustrating certain positions of the linkage connections to the propelling weight, for causing the propelling weight to move in the proper directions and phase relationship to propel the loading device in various desired directions along the ground.

Referring now in particular to Figures 25 to 30, inclusive, diagrammatically illustrating various positions of the linkage connections for moving the propelling weight 15 in various directions with respect to the base 13, in Figure 25 the linkage connections 116 and 118 are shown as being so positioned in their respective drive slots in the drive member 105 that said linkage connections will act together and reciprocably move the propelling weight 15 transversely of the base frame 13. As shown in this figure, the axes of connection of the linkages 116 and 118 to the driving member 105 are coaxial and are in an extreme forward end position with respect to said driving member. The axis of connection of the linkage connection 117 to said driving member 105 is shown as being coaxial with the pivotal axis of said driving member. Said last mentioned linkage connection is thus inoperative to reciprocably move said propelling weight. When the linkage connections are in the position shown in this figure, the propelling weight will move from the position shown in heavy lines to the position shown in light lines during its forward stroke in a direction which will be from the right to left-hand side of said base when looking towards said weight from the left-hand side of the sheet containing this figure. Said propelling weight will be given a relatively quick reversal at the end of its stroke while moving from the right to the left-hand side of the base. Said propelling weight will also be given a relatively slow reversal at the end of its return stroke as it changes its travel in a left to right direction, to a right to left direction. The propelling action of said propelling weight is thus from right to left, and said weight, when so driven, will shift said base along the ground in a direction from right to left.

Figure 26:
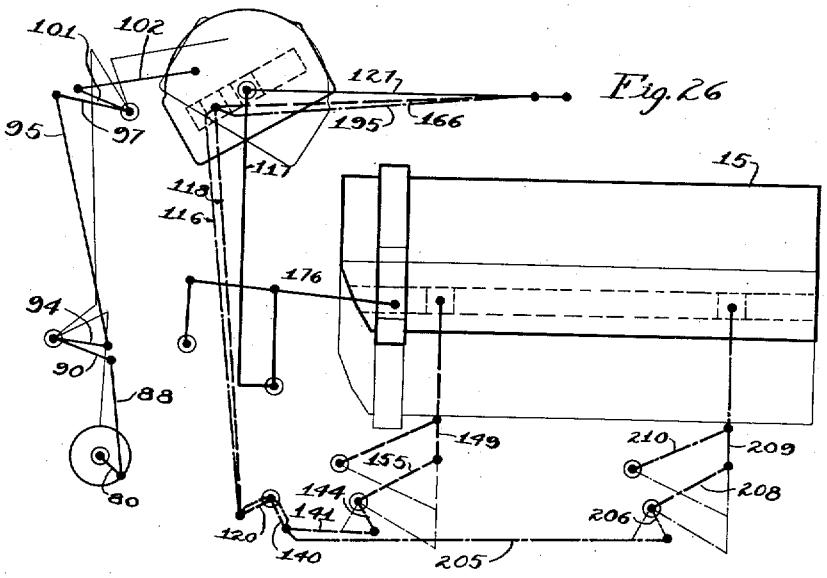

In Figure 26, the axes of connection of the linkages 116 and 118 have been shifted to the opposite side of the pivotal axis of the drive member 105 from that shown in Figure 25. When said links are in this position, said weight will be given its relatively quick reversal at the end of its stroke as it moves in a left to right direction from the position shown by heavy lines to the position shown by light lines. The base will thus be moved towards the right.

Figure 27:
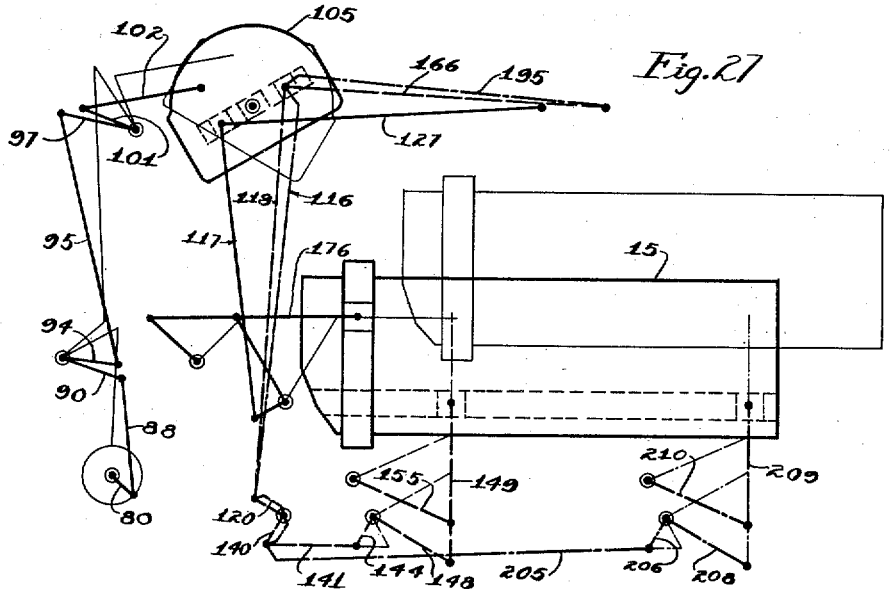

In Figure 27, the linkage connections 118 and 116 are shown in the same relative positions on the drive member 105 as in Figure 25, but the axis of pivotal connection of the linkage 117 to said drive member has been moved to a position at the opposite end of said drive member from the axes of pivotal connection of the linkage connections 116 and 118 to said drive member. This will cause the linkage connection 117 to reciprocably move the propelling weight 15 longitudinally of the base 13 at the same time it is moved transversely of said base by the linkage connections 116 and 118. In this position of the linkage connections 116, 117 and 118 on said drive member, the propelling weight will be given a reciprocating motion in an angular direction from the position shown by heavy lines to the position shown by light lines, in which the relatively quick reversal occurs at the end of the stroke in a forwardly direction and toward the left, a forwardly direction herein being a direction towards the far side of the sheet containing this figure when looking from the left-hand side of said sheet. This will cause said propelling weight to move the base 13 in an angularly forward direction towards the left.

Figure 28:
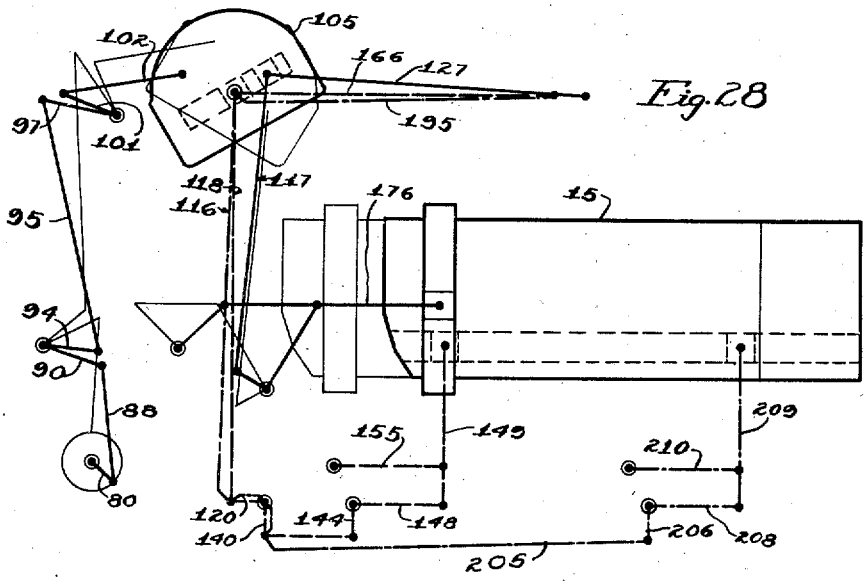

In Figure 28, the axes of connection of the respective linkage connections 118 and 116 are coaxial with the axis of rocking movement of said drive member. Said linkage connections will thus be inoperative and will perform no driving action on the propelling weight 15.

The axis of connection of the linkage connection 117 to said propelling weight, however, is shown as being moved to an extreme forward position. Said linkage connection will thus reciprocably move the propelling weight 15 along the base in a longitudinal direction, said weight being guided for such movement by means of the drive links 149 and 209 of the respective linkage connections 118 and 116, slidably guided in the longitudinal slot 150. The arrangement of said linkage connection 117 is such that the quick reversal of the weight 15 will occur at the end of its rearward stroke. This will cause said weight to move the base 13 in a rearward direction, which is herein shown as being a direction from the far to the near side of the sheet containing this figure when looking at this figure from the left-hand side of said sheet, to withdraw the shovel 16 from the working face.

When it is desired to move the loading device towards the working face, or in a forward direction, the linkage connection 117 is positioned as shown in Figure 3. In this position the axis of pivotal connection of said linkage connection to said drive member is on the opposite side of the axis of rocking movement of said drive member from that shown in Figure 28. With this arrangement the weight 15 will be operated so that its impelling force will be in substantially opposite phase relation with the reciprocating shovel 16, to advance said shovel as it makes its forward stroke with sufficient intensity to not only feed the shovel 16 into the broken down material it is desired to load, but also to engage said shovel with coal which is tightly wedged between the mine bottom and roof with sufficient force to cause said shovel to break down this tight coal.

Figure 29:
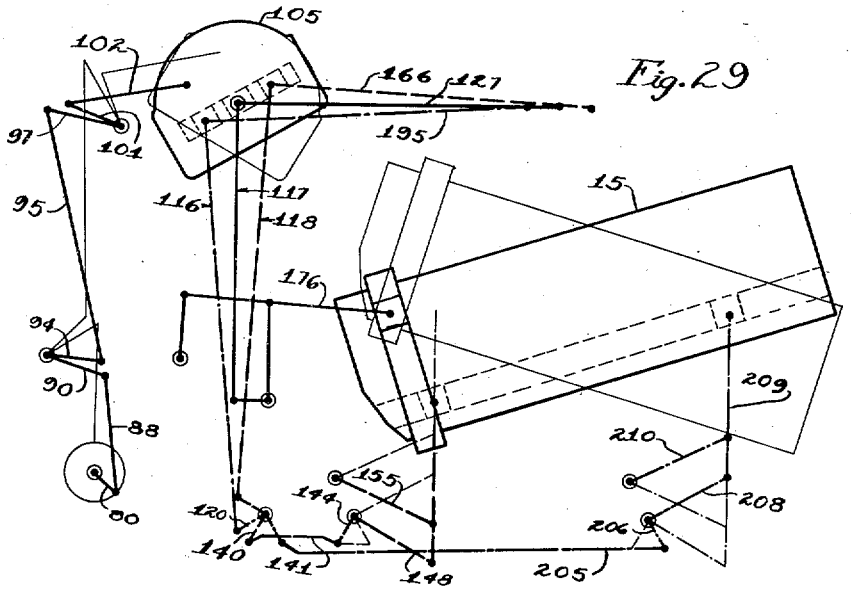

In Figure 29 the linkage connection 117 is shown as being in a neutral position and the linkage connections 116 and 118 are shown as being so positioned that their pivotal axes are on opposite sides of the axis of rocking movement of the drive member 105. Said linkage connections will thus reciprocably rock the propelling weight 15 in an angular direction about a centrally disposed axis, from the position shown in heavy lines to the position shown in light lines. This will cause said propelling weight to pivot the base in a clockwise direction, to angularly move the forward end of the shovel 16 from left to right.

Figure 30:
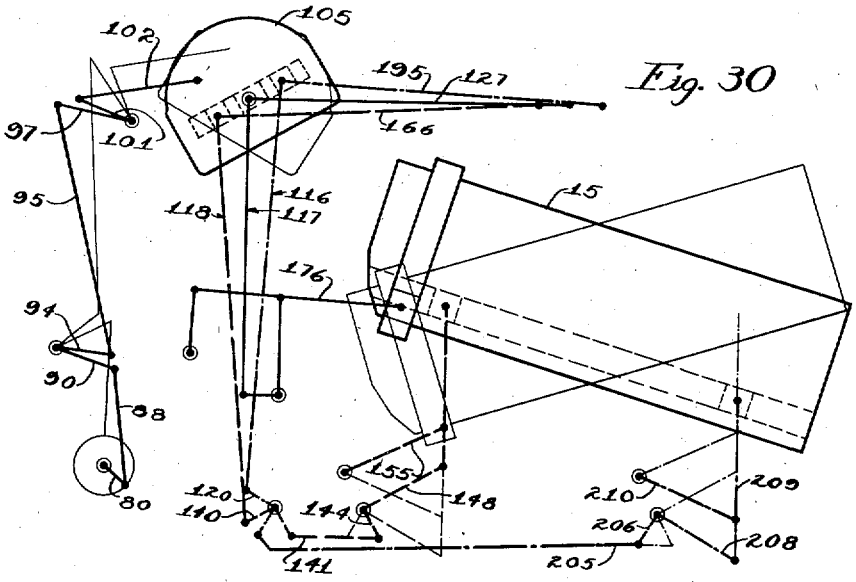

In Figure 30 the positions of the linkage connections 116 and 118 have been reversed from that shown in Figure 26, to reciprocably rock the propelling weight 15 in an opposite angular direction from that shown in Figure 26, and to cause the base to pivot in a counterclockwise direction and to angularly move the forward end of the shovel 16 from right to left.

As has been mentioned before, the intensity of the propelling action of the propelling weight may be increased or decreased by varying the distances of the axes of pivotal connection of the linkage connections to the drive member 15, from the pivotal axis of said drive member 105, it being understood that the farther away the points of connection of said linkage connections are from the pivotal axis of said drive member, the longer will be the stroke and the more intense will be the propelling action of said drive member. It should be understood, however, that as the propelling effect of said propelling weight is increased, that upon the return stroke of said propelling weight, the tendency of the base 13 to slip backwardly along the ground will correspondingly increase, the amount of backslip being determined by the frictional resistance between the bottom of said base and the ground. Accordingly, during operation of the device, the intensity of the conveying operation must be regulated by the stroke control links and cylinders in the hereinbefore described manner to such a degree that there is little or no backslip. It has been found that in certain cases where the frictional resistance between the bottom of the base and the ground is relatively low, that a soft stroke of the propelling weight, with a relatively low maximum velocity on the propelling stroke, will move the apparatus at a higher rate of speed than a hard stroke with a high maximum velocity, due to the fact that with the soft stroke there is little or no backslip of the base along the ground. Where the frictional resistance between the base and the ground is relatively high, the backslip will be decreased and it has been found that a harder propelling stroke can be utilized.

It may be seen from the foregoing that a new and improved loading device has been provided having a novel and improved form of mechanism for feeding a gathering shovel into the material it is desired to load, at varying intensities under the control of the operator, and for moving the device across and into or away from the working face. It may likewise be seen that the device may be readily controlled in a simplified manner from a point remote from the machine proper, thus enabling the operator to be close to the face when desired, or to be at a distance remote from the machine in cases where the machine is being fed into a tight place with a maximum intensity of the propelling weight 15, or where roof or other conditions might be bad close to the face.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a loading device of the class described, a base, a trough section mounted on said base for reciprocable movement with respect thereto, a shovel on the forward end of said reciprocating trough section for picking up loose material from the ground, and means for moving said base along the ground and for feeding said shovel into the material it is desired to load comprising a propelling weight on said base and means for reciprocably moving said propelling weight along said base in a transverse or longitudinal direction with respect thereto and in a definite phase relation with respect to said reciprocating trough section and shovel.

2. In a loading device of the class described, a base, a trough section mounted on said base for reciprocable movement with respect thereto, a shovel on the forward end of said trough section for picking up loose material from the ground, means for moving said base along the ground and for feeding said shovel into the material it is desired to load comprising a propelling weight on said base, means for reciprocably moving said propelling weight along said base in a definite phase relation with respect to said reciprocating trough section and shovel, and means for controlling the direction of movement of said propelling weight with respect to said base, to cause said propelling weight to move said base in various directions along the ground.

3. In a loading device of the class described, a base, a trough section mounted on said base for reciprocable movement with respect thereto, a shovel on the forward end of said trough section for picking up loose material from the ground, and means for moving said base along the ground and for feeding said shovel into the material it is desired to load comprising a propelling weight on said base, means for reciprocably moving said propelling weight along said base including a crank and a linkage connection between said crank and said weight, and other means for controlling movement of said linkage connection, to cause said propelling weight to move said base in a forward or return direction along the ground.

4. In a loading device of the class described, a base, a trough section mounted on said base for reciprocable movement with respect thereto, a shovel on the forward end of said trough section for picking up loose material from the ground, and means for moving said base along the ground and for feeding said shovel into the material it is desired to load comprising a propelling weight on said base, means for reciprocably moving said propelling weight longitudinally of said base including a crank, a member reciprocably driven thereby, a linkage connection between said member and said propelling weight, to give said weight a relatively quick reversal at one end of its stroke and a relatively slow reversal at the other end of its stroke, and means for interchanging the slow and quick reversals at the opposite ends of said strokes, to reverse the direction of travel of said base along the ground.

5. In a loading device of the class described, a base, a trough section mounted on said base for reciprocable movement with respect thereto, a shovel on the forward end of said trough section for picking up loose material from the ground, and means for moving said base along the ground and for feeding said shovel into the material it is desired to load comprising a propelling weight, means for reciprocably moving said propelling weight along said base including a crank, a member oscillatively driven thereby and linkage connections between said driven member and said propelling weight and connected with said propelling weight at spaced apart points, and means for controlling said linkage connections to cause said linkage connections to selectively reciprocably move said propelling weight in various directions along said base, to cause said propelling weight to move said loading device in the desired direction along the ground.

6. In a loading device of the class described, a base, a trough section extending along said base and reciprocably mounted thereon, a shovel on the forward end of said reciprocating trough section for picking up loose material from the ground, and means for moving said base along the ground and for feeding said shovel into the material it is desired to load comprising a propelling weight on said base, means for reciprocably moving said propelling weight along said base including a crank, a member oscillatively driven thereby, a linkage connection between said oscillatively driven member and said propelling weight for reciprocably moving said propelling weight longitudinally of said base, and other linkage connections between said oscillatively driven member and said propelling weight, for reciprocably moving said propelling weight in other directions with respect to said base.

7. In a loading device of the class described, a base, a trough section extending along said base and reciprocably mounted thereon, a shovel on the forward end of said reciprocating trough section for picking up loose material from the ground, and means for moving said base along the ground and for feeding said shovel into the material it is desired to load comprising a propelling weight on said base, means for reciprocably moving said propelling weight along said base including a crank, a member oscillatively driven thereby, a linkage connection between said oscillating member and said propelling weight, for reciprocably moving said propelling weight in one direction, other linkage connections between said oscillating member and said propelling weight for reciprocably moving said propelling weight in other directions, and means selectively operable for rendering any one of said linkage connections inoperative.

8. In a loading device of the class described, a base, a trough section extending along said base and reciprocably mounted thereon, a shovel on the forward end of said reciprocating trough section for picking up loose material from the ground, and means for moving said base along the ground and for feeding said shovel into the material it is desired to load comprising a propelling weight slidably mounted on said base, means for reciprocably moving said propelling weight along said base including a crank, a member oscillatively driven thereby, a linkage connection between said oscillating member and said propelling weight, for reciprocably moving said weight in one direction, other linkage connections between said oscillating member and said propelling weight, for reciprocably moving said weight in one direction, other linkage connections between said oscillating member and said propelling weight for reciprocably moving said weight in other directions, and means selectively operable for shifting the points of connection of said linkage connections to said oscillating member to vary the resultant propelling force exerted by said propelling weight in accordance with the direction it is desired to move said base.

9. In a loading device of the class described, a base slidable along the ground on its own bottom, a trough section mounted on said base for reciprocable movement with respect thereto, a shovel on the forward end of said reciprocating trough section for picking up loose material from the ground, and means for moving said base along the ground and for feeding said shovel into the material it is desired to load comprising a propelling weight slidably mounted on said base, means for reciprocably moving said propelling weight along said base including a crank, a member oscillatively driven thereby, a linkage connection between said oscillating member and said propelling weight, for reciprocably moving said propelling weight in one direction, other linkage connections between said oscillating member and said propelling weight for reciprocably moving said propelling weight in other directions, and means selectively operable for shifting the points of connection of said linkage connections to said oscillating member to vary the resultant propelling force exerted by said propelling weight when reciprocably driven by any one of said linkage connections comprising means for moving the points of connection of any one of said linkage connections to either side of the pivotal axis of said oscillating member and to a position coaxial with the pivotal axis of said oscillating member, to render any one of said linkage connections inoperative.

10. A face loading apparatus comprising a base, a trough section mounted on said base for reciprocable movement with respect thereto, a shovel on the end of said trough section, and means for moving said trough section and base towards and from the material it is desired to load including a propelling weight slidably mounted on said base, means for reciprocably driving said propelling weight including an oscillating member, a linkage connection between said oscillating member and said propelling weight, and means for shifting the axis of connection of said linkage connection to said oscillating member to a position to either side of the pivotal axis of said oscillating member, to reverse the direction of the propelling action of said propelling weight to cause said propelling weight to move said base in a forward or reverse direction.

11. A face loading apparatus comprising a base, a trough section mounted on said base for reciprocable movement with respect thereto, a shovel on the end of said trough section, and means for moving said trough section and base towards and from the material it is desired to load including a propelling weight slidably mounted on said base, means for reciprocably driving said propelling weight including an oscillating member driven about a fixed axis, a linkage connection between said oscillating member and said propelling weight including a rocking member, a drive link connecting said rocking member and said weight and another link connected from said oscillating member to said rocking member, and means for shifting the axis of connection of said other link to said oscillating member to a point coaxial with the pivotal axis of said oscillating member, to render said linkage connection inoperative to reciprocably move said weight, or to one side or the other of said pivotal axis to reverse the phase of reciprocable movement of said weight and reverse the direction of propulsive action of said weight and increase or decrease the propulsive effect of said weight.

12. A face loading apparatus comprising a base, a trough section mounted on said base for reciprocable movement with respect thereto, a shovel on the end of said trough section, and means for moving said trough section and base towards and from the material it is desired to load including a propelling weight slidably mounted on said base, means for reciprocably driving said propelling weight including an oscillating member driven about a fixed axis, a plurality of linkage connections between said oscillating member and said propelling weight, each of said linkage connections being adapted to reciprocably move said propelling weight along said base in a different direction and including a rocking member, a drive link connecting said rocking member with said weight, another link connecting said oscillating member with said rocking member, and means selectively operable for independently shifting the axes of connection of said linkage connections to said oscillating member to points coaxial with the pivotal axis of said oscillating member to render any one of said linkage connections inoperative, or to various distances to one side or the other of said base to reverse the phase of reciprocable movement of said weight and reverse the direction said propelling weight will move said base.

13. A propelling device particularly adapted to move a loading device or like apparatus along the ground, a base, a propelling weight mounted on said base for reciprocable movement with respect thereto, means for reciprocably moving said propelling weight with respect to said base in such a manner as to cause said weight to move said base along the ground, including an oscillatively driven drive member, a linkage connection between said drive member and said weight including a link having pivotal connection with said drive member, and means for shifting the axis of pivotal connection of said link to said drive member to a position coaxial with the pivotal axis of said drive member or to positions to one side or the other of the pivotal axis of said drive member, to reverse the phase of reciprocation of said weight and reverse the direction said propelling weight will move said base along the ground.

14. A propelling device particularly adapted to move a loading device or like apparatus along the ground, a base, a propelling weight mounted on said base for reciprocable movement with respect thereto, means for reciprocably moving said propelling weight with respect to said base in such a manner as to cause said weight to move said base along the ground, including an oscillatively driven drive member, a plurality of linkage connections between said drive member and said propelling weight, for reciprocably driving said propelling weight in various desired directions in planes substantially parallel to said base, each of said linkage connections including a link having pivotal connection with said drive member and means for selectively moving the points of pivotal connection of said links to said drive member, to positions coaxial with the pivotal axis of said drive member, to render any one of said linkage connections inoperative or to either side of the pivotal axis of said drive member to reverse the phase of movement of any one of said linkage connections and to change the direction of the propelling force of said weight.

15. A propelling device particularly adapted to move a loading device or like apparatus along the ground, a base, a propelling weight slidably mounted on said base, an oscillatively driven member, a linkage connection between said oscillatively driven member and said weight for reciprocably moving said weight along said base including a link having a slidably adjustable pivotal connection with said oscillating member, and means selectively operable for shifting the pivotal axis of said link to a position coaxial with the pivotal axis of said oscillating member to render said linkage connection inoperative or to positions to either side of said pivotal axis to reverse the direction of the propulsive action of said weight.

16. A propelling device particularly adapted to move a loading device or like apparatus along the ground, a base, a propelling weight slidably mounted on said base, an oscillatively driven member, a plurality of linkage connections between said oscillatively driven member and said weight and connected to said weight at spaced apart points, for reciprocably moving said weight along said base in various directions, said linkage connections each including a link having a slidably adjustable pivotal connection with said oscillating member, and means selectively operable for independently shifting the pivotal axes of said links to positions coaxial with the pivotal axis of said oscillating member to render any one of said linkage connections inoperative or to positions to either side of said pivotal axis, to reverse the direction of the propulsive action transmitted to said weight by any one of said linkage connections and control the direction of movement of said base.

17. In a shaker conveyer loading device, a base, a trough section mounted on said base for reciprocable movement with respect thereto, a gathering shovel on the forward end of said trough section, a reciprocably driven propelling weight slidably mounted on said base, means for moving said propelling weight along said base in various directions and for controlling reciprocable movement thereof, to cause said weight to move said base along the ground as desired, and a counterweight driven in opposite phase relation with respect to said trough section for neutralizing the shaking effect of said trough section on said propelling weight and base.

18. In a loading device for conveyers, a base, a reciprocating trough section mounted on said base, a shovel on the forward end of said reciprocating trough section, a motor on said base, means driven by said motor for reciprocably driving said reciprocating trough section, means for moving said base along the ground and for moving said shovel into the material it is desired to load including a propelling weight slidably mounted on said base, means driven by said motor for reciprocably moving said propelling weight along said base, and means for neutralizing the shaking effect of said trough section on said base comprising a counterweight driven by said said motor in opposite phase relation with respect to said trough section.

19. In a loading device for shaker conveyers, a base, a reciprocating trough section mounted on said base for reciprocable movement with respect thereto and guided for movement in a forwardly and downwardly inclined direction upon its forward stroke, a shovel projecting from the forward end of said trough section and transversely pivoted thereto, and means for limiting transverse pivotal movement of said shovel with respect to said trough section and for yieldably holding the forward end of said shovel in engagement with the ground during reciprocation of said trough section.

20. In a loading device for shaker conveyers, a base, a reciprocating trough section mounted on said base for reciprocable movement with respect thereto and guided for movement in a forwardly and downwardly inclined direction upon its forward stroke, a shovel projecting from the forward end of said trough section and having slidable engagement with the ground at its forward end, and a propelling weight slidably mounted on said base, means for reciprocably driving said weight along said base in opposite phase relation with respect to said reciprocating trough, to cause said weight to feed said shovel into the material it is desired to load, and control means for said driving means, to cause said weight to be driven transversely with respect to said base, to cause lateral movement of said base along the ground.

21. In a loading device for shaker conveyers, a base, a reciprocating trough section mounted on said base for reciprocable movement with respect thereto and guided for movement in a forwardly and downwardly inclined direction upon its forward stroke, a shovel projecting from the forward end of said trough section and mounted for yieldable engagement with the ground at its forward end, a propelling weight slidably mounted on said base, means for reciprocably driving said propelling weight along said base in opposite phase relation with respect to said reciprocating trough, to cause said propelling weight to feed said shovel in a forward direction into the material it is desired to load, and control means for said drive means for reversing the direction of the propelling action of said weight to cause said propelling weight to withdraw said shovel from the material it is desired to load.

22. In a propelling device for a loading mechanism and the like, a base slidable on its bottom on the ground, a propelling weight on said base, means for imparting a plurality of component motions to said weight horizontally on said base in different directions, and means for controlling the relative intensities of said motions so as to vary the resultant direction of movement of said weight relative to said base to move the latter in various directions along the ground.

23. In a propelling device for a loading mechanism and the like, a base, a propelling weight movable horizontally in various directions on said base, means for imparting variable reciprocating motions to said weight including a crank, a member oscillatively driven thereby, a plurality of linkage connections between said driven member and said propelling weight and connected with the latter at spaced apart points, and means for controlling said linkage connections to selectively move said weight in various directions along said base, to cause said weight to move said base in corresponding directions along the ground.

24. In a propelling device for a loading mechanism and the like, a base, a propelling weight movable horizontally in various directions on said base, means for imparting variable reciprocating motions to said weight including a crank, a member oscillatively driven thereby, a linkage connection between said driven member and said weight normally tending to reciprocate the latter longitudinally of said base, and another linkage connection between said driven member and said weight tending to reciprocate the latter transversely of said base.

25. In a propelling device for a loading mechanism and the like, a base, a propelling weight movable horizontally in various directions on said base, means for imparting variable reciprocating motions to said weight including a crank, a member oscillatively driven thereby, a linkage connection between said driven member and said weight normally tending to reciprocate the latter longitudinally of said base, and another linkage connection between said driven member and said weight tending to reciprocate the latter transversely of said base, and means selectively operable for rendering either of said linkage connections inoperative.

26. In a propelling device for a loading mechanism and the like, a base, a propelling weight movable horizontally in various directions on said base, means for imparting variable reciprocating motions to said weight including a crank, a member oscillatively driven thereby, a linkage connection between said driven member and said weight normally tending to reciprocate the latter longitudinally of said base, and another linkage connection between said driven member and said weight tending to reciprocate the latter transversely of said base, and means selectively operable for varying the relative effectiveness of motion imparted to said weight through said linkage connections.

27. In a propelling device for a loading mechanism and the like, a base slidable on its bottom on the ground, a propelling weight mounted for relatively free horizontal movement on said base, means for imparting variable reciprocating motion to said weight including a crank, a member oscillatively driven thereby, a linkage connection between said oscillating member and said weight for reciprocating the latter in one direction, another linkage connection between said oscillating member and said weight for moving said weight in another direction, and means selectively operable for shifting the points of connection of said linkage connections to one side or the other of the pivotal axis of said oscillating member or to a position coaxial with said pivotal axis, to control the relative effectiveness and the resultant direction of the propulsive action transmitted to said weight through said linkage connections.

28. In an inertia propelling device, a base, a reciprocable propelling member mounted on said base, means for driving said reciprocable propelling member so as to impart a propelling action thereto in one direction, said means including an oscillating member driven at a variable angular velocity by said drive means, and a linkage connection between said oscillating member and said propelling member including a link having an adjustable pivotal connection with said oscillating member, selectively operable for shifting the pivotal axis of said link to a position coaxial with the pivotal axis of said oscillating member to render said linkage connection inoperative, or to positions to either side of said last named pivotal axis to reverse the direction of the propulsive action of said propelling member.

29. In an inertia propelling device, a base, a reciprocable propelling member mounted on said base, means for driving said reciprocable propelling member so as to impart a propelling action thereto in one direction, said means including an oscillating member driven at a variable angular velocity by said drive means, and a linkage connection between said oscillating member and said propelling member including a link having a slidable adjustable pivotal connection with said oscillating member, selectively operable for shifting the pivotal axis of said link to a position coaxial with the pivotal axis of said oscillating member to render said linkage connection inoperative, or to positions to either side of said last named pivotal axis to reverse the direction of the propulsive action of said propelling member.

30. In an inertia propelling device, a base, a reciprocable propelling member mounted on said base, means for driving said reciprocable propelling member so as to impart a propelling action thereto in one direction, said means including an oscillating member driven at a variable angular velocity by said drive means, and a linkage connection between said oscillating member and said propelling member including a link having a slidable adjustable pivotal connection with said oscillating member in a substantially straight line including the pivotal axis of said oscillating member, said adjustable pivotal connection being selectively operable for shifting the pivotal axis of said link to a position coaxial with the pivotal axis of said oscillating member to render said linkage connection inoperative, or to positions to either side of said last named pivotal axis to reverse the direction of the propulsive action of said propelling member.

WILLIAM W. SLOANE.